United States Patent [19]
Kozak

[11] Patent Number: 5,140,699
[45] Date of Patent: Aug. 18, 1992

[54] DETECTOR DC OFFSET COMPENSATOR

[75] Inventor: John P. Kozak, Simi Valley, Calif.

[73] Assignee: American Nucleonics Corporation, West Lake Village, Calif.

[21] Appl. No.: 632,549

[22] Filed: Dec. 24, 1990

[51] Int. Cl.⁵ ............................................. H04B 1/40
[52] U.S. Cl. ................................. 455/84; 455/278.1; 455/296
[58] Field of Search ...................... 455/78, 83, 84, 133, 455/273, 278, 295, 303-306, 214, 296; 329/318-320

[56] References Cited

U.S. PATENT DOCUMENTS

| | | |
|---|---|---|
| 3,699,444 | 10/1972 | Ghose et al. |
| 4,373,207 | 2/1983 | Hecken ............................ 455/273 |
| 4,466,131 | 8/1984 | Ghose et al. |
| 4,878,252 | 10/1989 | Sessink ............................. 455/278 |
| 4,914,714 | 3/1990 | Tamura ............................. 455/78 |
| 4,982,442 | 1/1991 | Sarokhanian ..................... 455/83 |

FOREIGN PATENT DOCUMENTS 2567700 1/1986 France .................. 455/133

*Primary Examiner*—Curtis Kuntz
*Attorney, Agent, or Firm*—Hoffmann & Baron

[57] ABSTRACT

A DC offset compensation circuit for use with a detector of an interference cancellation system or the like includes an RF switch. The interference cancellation system has a reference signal path on which a reference signal representative of an interfering signal is provided to the detector, and an error signal path on which an error signal representative of a received signal of a radio receiver system to which the interference cancellation system is connected is provided to the detector. The RF switch is positioned in the error signal path of the interference cancellation system and is switchable between an open position in which the detector is disconnected from the error signal path, and a closed position in which the detector is connected to the error signal path. A switch controller is coupled to the RF switch, and controls the positioning of the RF switch in the open and closed positions. The detector provides a first DC signal when the RF switch is in the open position. The first DC signal is representative of the DC offset voltage the detector and associated circuitry generate. The detector further provides a second DC signal when the RF switch is in the closed position. The second DC signal is representative of the DC offset voltage the detector generates and a DC voltage attributable to an error signal provided to the detector. The first and second DC signals are measured, and the difference in magnitude between the two signals is calculated to produce the compensated result.

4 Claims, 2 Drawing Sheets

DETECTOR DC OFFSET COMPENSATOR

BACKGROUND OF THE INVENTION

1. Field of the Invention

This invention relates to a DC offset compensator for a detector, and more specifically relates to a detector DC offset compensator applicable for use in a frequency agile, interference cancellation system.

2. Description of the Prior Art

Interference cancellation systems and methods for minimizing or eliminating interference in radio receivers due to unwanted signals are well known in the art. Such systems generally employ a synchronous detector and a signal controller connected together with additional components to form an adaptive control loop.

The synchronous detector receives on one input a reference signal which corresponds to an RF sample of an interfering signal, and receives on another input a sample of the signal received by the receiver. A synchronous detector compares the reference signal and the sample signal, and provides DC error signals to control loop integrators. The integrator outputs are then applied to the control ports of the signal controller.

The signal controller receives not only the control signals from the integrators but also the reference signal, and generates an appropriate cancellation signal which is used to cancel the interfering signal in the radio receiver to which the interference cancellation system is coupled. The signal controller, synchronous detector, and other loop components define an adaptive control loop in the interference cancellation system that generates a cancellation signal which is adjusted in phase and amplitude until the error signal is minimized, thus minimizing the interfering signal received by the radio receiver.

As mentioned above, the synchronous detector is coupled to the signal controller and provides DC error signals to the control loop. Any DC offset in the DC error signal path affects the signal controller's proper adjustment of the phase and amplitude of the cancellation signal, resulting in incomplete or unsatisfactory cancellation of the interfering signal.

U.S Pat. No. 3,699,444, which issued to Rabindra Ghose et al., discloses a typical interference cancellation system which employs a chopper stabilization circuit in order to eliminate DC offset problems inherent in the cancellation system.

FIG. 1 of the Ghose et al. patent illustrates the chopper stabilization circuit. A sample of the received signal is provided via a coupler to an RF switch 32 which is driven by a 10 kHz multivibrator 33, which acts as a local oscillator. Switch 32 acts essentially as a mixer or, as shown in FIG. 2, a 10 KHz modulator 32a. The signal thus provided to the separate in-phase and quadrature phase synchronous detectors 36,35 is the sum product (or difference) of the 10 KHz multivibrator signal and the sampled receive signal.

As shown in FIG. 2 of the Ghose et al. patent, the in-phase synchronous detector 36 basically includes an RF demodulator 50, amplifier 52 and 10 KHz demodulator 54. Similarly, the quadrature phase synchronous detector 35 includes an RF demodulator 51, amplifier 53 and 10 KHz demodulator 55.

The RF demodulators 50, 51 receive the sum product (or difference) signal from RF switch 32 as well as the reference signal from the transmitting antenna (see FIG. 1 of the Ghose et al. patent). Since the reference interfering signal and sampled receive signal are at the same frequency, the error information is contained in the amplitude of the two 10 KHz output signals from in-phase and quadrature phase RF demodulators 50, 51. The 10 KHz carrier signal is removed in each of the in-phase and quadrature phase channels by demodulators 54,55. The DC signals from the demodulators 54,55 are provided to amplifier integrators (i.e., components 56-59 in FIG. 2 or designated by reference numerals 37,38 in FIG. 1), which are used to drive the signal controllers 39,40 of the interference cancellation system.

Since the 10 KHz demodulators 54,55 are always working at one frequency, their DC offsets can be eliminated by adjustment. The DC offsets attributable to the RF demodulators 50,51 are unimportant since the error signal information is contained in the amplitudes of their 10 KHz output signals. Thus, Ghose et al. minimize the offset problem by providing a single, lower frequency conversion to DC and eliminating many of the frequency dependent effects on the DC error signals provided to the control loops.

The interference cancellation system disclosed in the Ghose et al. patent, and in particular the chopper stabilization circuit of that system, works well in many applications and in various frequency bands of operation. However, there may be some disadvantages with using the chopper stabilization circuit described in the Ghose et al. patent.

First, spurious signals may be generated in the chopper circuit by desired signals in the receive line. These desired signals are not cancelled by the system, since they are what the receiver system is trying to receive. Harmonics of the chopper multivibrator, functioning as a local oscillator, may mix with these desired signals creating spurious signals that may contribute to the DC value at the final conversion in the synchronous detectors. If so, they will eventually dominate as the error signal is reduced. Even if pre-selection and post-conversion filters are respectively interposed before and after the RF switch mixer, the sum product or difference in the local oscillator harmonics and the desired signals may still fall within the filters' passband.

Second, the chopper oscillator signal or its harmonics may leak through the RF switch 32, RF amplifier 31 and the coupler and out the receive antenna. The amplitude of such leakage depends, of course, on the power level of the multivibrator signal and the isolation provided by the various components used in the system.

Third, the chopper technique does not compensate for offset voltage variations due to changes in temperature or reference signal level.

OBJECTS AND SUMMARY OF THE INVENTION

It is an object of the present invention to provide a method and apparatus for compensating for DC offset voltages generated by a detector, the method and apparatus being particularly applicable for use in an interference cancellation system, but also applicable in many different types of sampled data systems or analog systems employing a synchronous (coherent) detector.

It is another object of the present invention to provide a DC offset compensator for use in frequency agile applications.

It is a further object of the present invention to provide a DC offset compensator which compensates for DC offset variations due to changes in frequency as well as temperature and reference signal level.

It is yet another object of the present invention to provide a detector DC offset compensator having a reduced size, weight and power requirement over conventional schemes and with improved reliability.

It is yet another object of the present invention to provide a detector DC offset compensator which overcomes the inherent disadvantages of known compensators.

A detector DC offset compensator circuit, formed in accordance with the present invention, is particularly adapted to work with a frequency agile interference cancellation system. Such an interference cancellation system is adapted to be connected to a radio receiver system having a receive antenna, a receiver and a receiver transmission line electrically coupling the receive antenna to the receiver. The interference cancellation system is also adapted to be connected to a radio transmitter system similarly having a transmit antenna, a transmitter and a transmitter transmission line electrically coupling the transmit antenna to the transmitter.

The interference cancellation system includes a signal controller, which receives a first reference signal corresponding to the signal transmitted by the transmitter, and which generates a cancellation signal which is injected into the receiver transmission line of the radio receiver system to cancel any transmitter interfering signals received by the receive antenna. The signal controller further includes two input ports for receiving control signals to which the signal controller responds in order to provide a cancellation signal which is equal to and opposite in phase to an interfering signal received by the receive antenna, and carried by the receiver transmission line so as to cancel the received interfering signal.

In frequency agile applications, the control loops are usually implemented with a digital computer. In this case, the two control signal input ports of the signal controller are connected to the outputs of digital-to-analog converters. The inputs of the digital-to-analog converters are connected to the control computer of the interference cancellation system. The control computer includes a memory which functions as a look-up table that provides selected digital data signals to the digital-to-analog converters, which convert the signals to control voltages for the signal controller.

The interference cancellation system further includes a detector, a reference signal path on which a reference signal representative of an interfering transmit signal is provided to the detector, and an error signal path on which an error signal representative of the residual interfering signal (after summing the cancellation signal with the received signal of the radio receiver to which the cancellation system is connected) is provided to the detector. More specifically, the detector includes a reference signal port, which receives a second reference signal that corresponds to the interfering signal transmitted by the transmitter, and an error signal port, which receives an error signal which corresponds to the residual interfering signal. The detector further includes a power divider which divides the error signal into secondary error signals, and a quadrature hybrid, which divides the second reference signal into an in-phase and quadrature-phase reference signal.

The detector further includes first and second mixers, which respectively receive the in-phase reference signal and the quadrature phase reference signal, and the first secondary error signal and the second secondary error signal. The first and second mixers provide analog in-phase and quadrature phase DC error signals, respectively, from those components in the error signal that are correlated with the reference signal. It should be noted that for a frequency agile application, these "DC" error signals are only slowly varying within each burst interval and change rapidly as the carrier frequency of each burst is changed. The DC error signals are converted to digital signals by respective first and second analog-to-digital converters, which digital signals are provided to the control computer as a measure of the error in the amplitude and phase of the cancellation signal.

The DC offset compensation circuit of the present invention includes an RF switch which is interposed between the error signal port of the detector and the third directional coupler which is coupled to the receiver transmission line. The RF switch basically opens and closes the error signal path, i.e., the connection between the detector of the interference cancellation system and the radio receiver system on which the error signal is provided. The opening and closing of the switch is actuated by the control computer of the interference cancellation system.

When the transmitter transmits a signal, the transmission of the signal is detected by the control computer of the interference cancellation system, which causes the RF switch to open for a brief duration, breaking the connection between the detector and the radio receiver system. Accordingly, no error signal is provided to the mixers of the detector.

During the time when the connection between the detector and the radio receiver system is broken, the control computer effectively calculates the amount of DC offset attributable to the mixers of the detector, amplifiers, and analog-to-digital converters. The control computer will then close the RF switch so that the error signal may be provided to the detector. The control computer effectively measures the new amplitude of the first and second control loop signals, now affected by the error signal, and subtracts out the previous measurement when no error signal is provided to the detector, thereby compensating for the DC offset introduced by the detector and its associated circuitry.

These and other objects, features and advantages of this invention will be apparent from the following detailed description of illustrative embodiments thereof, which is to be read in connection with the accompanying drawings.

DETAILED DESCRIPTION OF THE PREFERRED EMBODIMENTS

Figure 1:
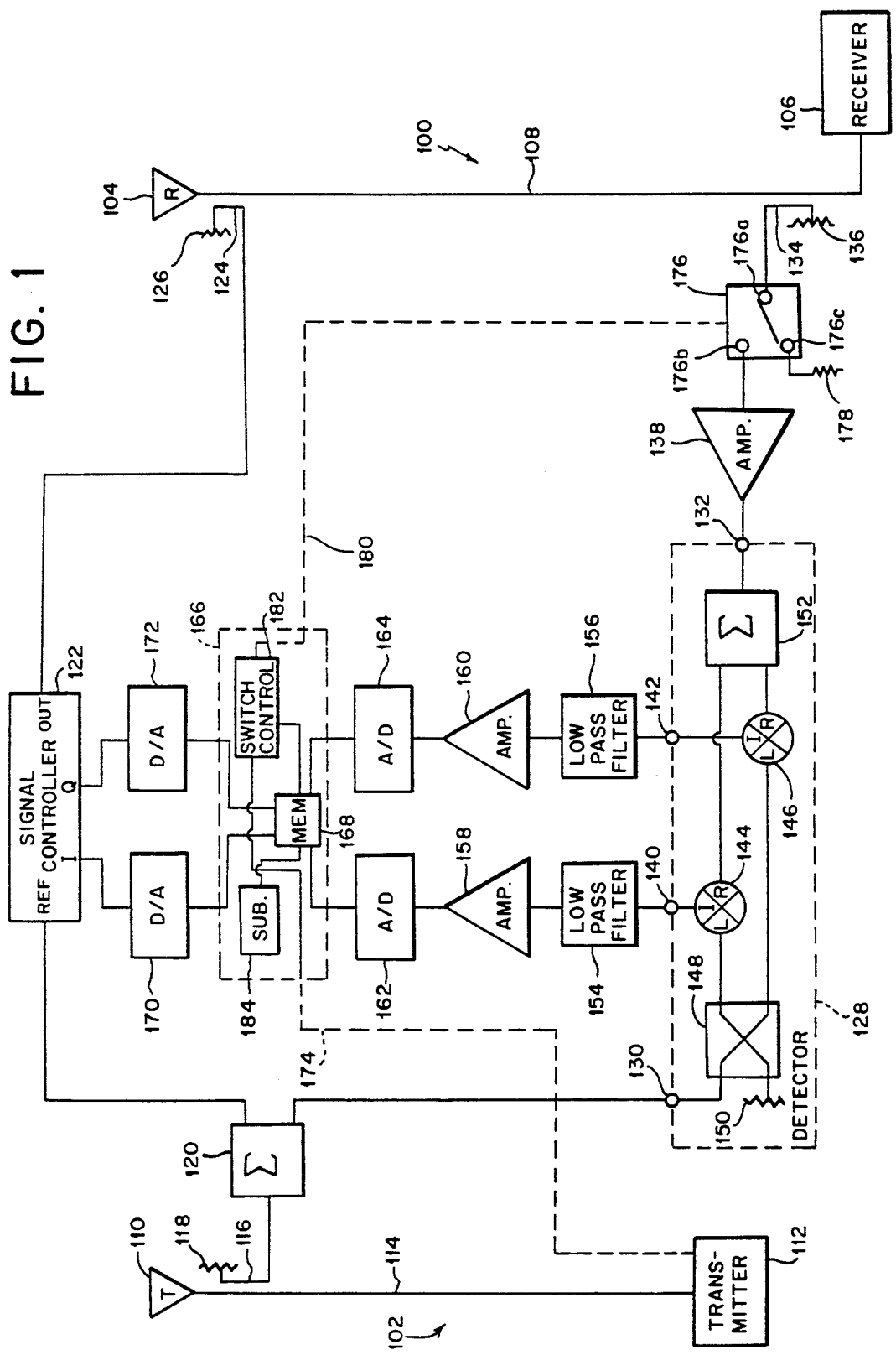
FIG. 1 is a functional block diagram of an interference cancellation system incorporating the detector DC offset compensator of the present invention.

FIG. 1 illustrates functionally the operation and one form of a DC offset compensation circuit for a detector used in an interference cancellation system, as well as the interconnection of the compensation circuit with the interference cancellation system. To facilitate an understanding of the invention, the operation and structure of the interference cancellation system to which the detector DC offset compensator is connected will now be described.

The interference cancellation system is adapted to be connected to a radio receiver system 100 as well as a radio transmitter system 102. The radio receiver system 100 includes a receive antenna 104, a receiver 106 and a receiver transmission line 108 connecting the receive antenna to the receiver. Similarly, the radio transmitter system 102 includes a transmit antenna 110, a transmitter 112 and a transmitter transmission line 114 connecting the transmit antenna to the transmitter.

In this particular application, the interference cancellation system is preferably frequency agile, that is, it must rapidly adapt and be responsive to changes in the frequency of the transmitter 112. The transmitter transmits a signal comprising signal bursts of relatively short duration, each burst having a different carrier frequency.

The signal transmitted by the transmit antenna 110 is received by the receive antenna 104 of the radio receiver system and thus interferes with the reception of a desired signal in the radio receiver system. This problem may be especially acute when the transmitter and receiver are collocated. Hence, there is a need for an interference cancellation system to cancel the interfering signal in the radio receiver.

The transmit signal of the radio transmitter system 102 is sampled by using a first directional coupler 116 which is connected to the transmitter transmission line 114. One output of the coupler is terminated using an appropriate termination 118, and the other output is provided to the input of a first power divider or summer 120. The first power divider 120 includes at least two output ports on which are provided a first reference signal and a second reference signal, each of which corresponds to the sampled transmit signal.

The interference cancellation system includes a signal controller 122. The signal controller 122 has a reference signal (REF) port to which the first reference signal is provided, and includes an output (OUT) port on which a cancellation signal is provided. The signal controller 122 effectively adjusts the phase and amplitude of the first reference signal (which corresponds to the sampled transmit signal), and provides a cancellation signal adjusted in phase and amplitude which may be injected into the receiver transmission line 108 to cancel the corresponding interfering signal received by the radio receiver system. The signal controller 122 further includes in-phase (I) and quadrature phase (Q) control signal input ports, on which are received control signals to which the signal controller responds in adjusting the phase and gain of the cancellation signal. The cancellation signal is provided to one input of a second directional coupler 124, the other input of which is terminated using an appropriate termination 126. The second directional coupler 124 is coupled to the receiver transmission line 108 of the radio receiver system 100.

As with generally all conventional interference cancellation systems, the interference cancellation system described herein also includes a detector, shown generally by the dashed line 128. The detector 128 includes a reference signal port 130, which receives the second reference signal, and an error signal port 132, which receives an error signal.

The error signal is provided by having a third directional coupler 134 coupled to the receiver transmission line 108. The third directional coupler 134 includes two outputs, one of which is terminated with an appropriate termination 136. The other output provides the error signal, which is essentially a sample of the desired signal received by the receive antenna 104 and the radio receiver system 100, and the residual interfering signal present after the cancellation signal is injected. This error signal is amplified by an amplifier 138 and provided to the error signal port 132 of the detector. The detector 128 includes first and second output ports 140, 142 on which are respectively provided analog in-phase and quadrature phase DC signals that correspond to the amplitude of the residual in-phase and quadrature phase components of the interfering signal.

The detector 128 used in the interference cancellation system described herein differs from the synchronous detectors described in the Ghose et al. patent. As mentioned previously, each synchronous detector of the Ghose et al. interference cancellation system includes an RF demodulator and a 10 KHz demodulator. The detector 128 used in the interference cancellation system described herein employs only two mixers—a first mixer 144 and a second mixer 146, as will be described in greater detail.

The detector 128 of the interference cancellation system includes a quadrature hybrid 148. A first input port of the quadrature hybrid is connected to the reference signal port 130 of the detector, and a second input port of the hybrid is terminated using an appropriate termination 150.

The quadrature hybrid 148 includes two output ports. The second reference signal which is provided to the first input port of the hybrid is divided into an in-phase reference signal on one output port, and a quadrature phase reference signal on the other output port. The in-phase and quadrature phase reference signals are 90° out of phase with one another.

The error signal on the error signal port 132 of the detector is provided to the input port of a second power divider 152 of the detector. The second power divider 152 includes two output ports, and the error signal is divided into first and second secondary error signals provided on the output ports of the power divider. The first and second secondary error signals are in phase with each other.

Each of the first and second mixers 144, 146 of the detector includes a local oscillator (L) input port, an RF or radio frequency (R) input port, and an IF or intermediate frequency (I) output port. The in-phase reference signal from the quadrature hybrid 148 is provided to the L input port of the first mixer 144, and the first secondary error signal is provided to the R input port of the first mixer 144. The quadrature phase reference signal from the quadrature hybrid 148 is provided to the L input port of the second mixer 146, and the second secondary error signal from the second power divider 152 is provided to the R input port of the second mixer 146. The in-phase DC error signal is generated on the I output port of the first mixer 144 and is provided to the first output port 140 of the detector, and the quadrature phase DC error signal is generated on the I output port of the second mixer 146 and is provided to the second output port 142 of the detector. Again, it should be noted that what are called DC error signals are only constant or slowly varying within a burst interval. As the carrier frequency changes for each burst, so do the signal controller control values and the resulting error signals.

The in-phase and quadrature phase DC error signals provided on the output ports of the detector are provided to the inputs of a first low pass filter 154 and a second low pass filter 156, respectively. The outputs of the first and second low pass filters are connected to the inputs of a first DC amplifier 158 and a second DC amplifier 160, respectively.

The interference cancellation system described herein employs a digital control loop. The outputs of the first and second DC amplifiers 158,160 are respectively provided to the inputs of first and second analog-to-digital converters 162 and 164, respectively. The analog in-phase and quadrature phase DC signals generated by the detector are digitized by the first and second analog-to-digital converters 162,164, respectively, and the digitized error signals are provided to a control computer 166 comprising a portion of the control loop of the interference cancellation system.

As its name implies, the control computer 166 controls the amplitude of the in-phase and quadrature phase control signals provided to the signal controller 122. The control computer includes a memory 168, which functions at least in part as a look-up table. This table contains previously computed control signals for the signal controller, as a function of carrier frequency, to be applied to the signal controller digital-to-analog converters 170, 172 when each frequency occurs. As each carrier frequency occurs, the control computer 166 receives the digitized in-phase and quadrature phase DC error signals, applies them to the control equation and memory values for this particular frequency, and stores the results back in memory for the next occurrence of this particular frequency, and outputs the digital equivalent codes of the desired control signals. The control equation is the digital equivalent of an analog control loop, as is well known in digital control theory, and it is used to adjust the values of the signal controller control signals in such a way that the DC error signals are minimized, thus minimizing the interfering signal. The computer provides these digital codes to the inputs of first and second digital-to-analog converters 170 and 172, respectively, which generate the analog in-phase and quadrature phase control signals corresponding to the digital equivalent codes. The in-phase and quadrature phase control signals are provided to the signal controller 122 and cause the signal controller to adjust the phase and amplitude of the first reference signal to provide an appropriate cancellation signal.

The control computer 166 is also coupled to the transmitter, as illustrated by dashed line 174, so that the computer knows the time at which the transmission signal bursts occur, and the carrier frequency of each burst.

In accordance with the present invention, the following arrangement and method are used to provide DC offset compensation for the detector of the interference cancellation system.

An RF switch 176 is interposed between the unterminated output of the third directional coupler 134 and the input of the error signal amplifier 138. The RF switch 176 operates as a double pole, single throw switch, with the wiper 176a connected to the third directional coupler 134, one pole 176b connected to the input of the error signal amplifier 138, and the other pole 176c connected to an appropriate termination 178. The movement of the wiper is controlled by the control computer 166, as illustrated by dashed line 180. As mentioned previously, the control computer is provided with information regarding the start time of each transmit signal burst, and will open and close switch 176 in accordance with this start time information.

In accordance with the present invention, the DC offset of the detector is measured and compensated for in the following manner. The control computer 166 includes a switch controller portion 182 which causes the RF switch 176 to open and disconnect the third directional coupler 134 from the error signal amplifier 138 so that no error signal is provided to the detector. The opening of the RF switch occurs during a predetermined portion of the transmit signal burst, and preferably during the first half portion of the burst. With no error signal provided to the detector 128, but with the in-phase and quadrature phase reference signals provided to the L inputs of the first and second mixers 144,146, DC offsets will be generated by the mixers of the detector. Such DC offsets will pass through the first and second filters 154,156 and will be amplified by the first and second DC amplifiers 158,160, which also contribute a certain amount of offset to the system. The amplified DC offsets will be converted to digital signals by the first and second analog-to-digital converters 162,164, which also contribute offset, and the digitized DC offset signals will be provided to the control computer 166.

The control computer 166 will store the digitized DC offset signals in the memory 168, and includes a subtractor portion 184 which will effectively subtract these DC offset values from the digitized DC error signals it receives from the detector when the error signal is present.

After a predetermined period has elapsed and while the transmit signal burst is still present, the switch controller portion 182 of the control computer will signal the RF switch 176 to close to reconnect the error signal amplifier 138 to the third directional coupler 134 so that an error signal may be provided to the detector. The detector 128 will generate new in-phase and quadrature phase DC error signals which effectively include the component attributable to the error signal as well as the undesired DC offset component of the detector. The in-phase and quadrature phase DC error signals are digitized as described previously and are provided to the control computer 166. The digitized information is placed in the memory 168. The subtractor portion 184 of the control computer then subtracts out the previously measured digitized DC error signal the computer receives when no error signal is present, from the digitized DC error signal the computer receives when the error signal is provided to the detector. The resulting data corresponds to the true DC error signal level attributable only to the error signal without the effect of DC offsets from the first and second amplifiers, mixers and other components of the detector.

Based on the true value of the in-phase and quadrature phase detector DC signals (that is, with the offset subtracted out), the control computer 166 applies the offset corrected, digitized DC error signals to the control equation and memory values for the particular carrier frequency, as described previously, stores the results back in the look-up table memory 168 for the next occurrence of this particular frequency and outputs the digital equivalent codes of the desired control signals. The digitized in-phase and quadrature phase control signals selected by the control computer are provided to the first and second digital-to-analog converters 170,172, which respectively convert the digitized data to an analog in-phase and quadrature phase control signal, which signals are provided to the I and Q control ports of the signal controller 122.

The detector DC offset compensation circuit and method of the present invention eliminates the problems associated with a chopper stabilization circuit, such as possible leakage of the local oscillator from the receive antenna, offsets due to desired signals mixing with harmonics of the local oscillator whose products are within the passband of the system, and the inability to compensate for offset voltage variations due to changes in temperature or reference signal level. Thus, a single conversion error detector may be used in the system, that is, where the reference signal and the error signal are mixed in a single stage, without the need for the multiple stages of modulation and demodulation associated with the chopper approach.

The compensation circuit dynamically adjusts for changes in the offset voltage by taking an offset sample before each DC error signal sample is taken, and correcting each DC error signal sample for the DC offset before it is applied to the control loop. Thus, offset voltage variations due to changes in temperature, reference signal level, or reference frequency are compensated as they occur.

The single conversion approach of the present invention substantially reduces the hardware needed to handle the DC offset problem. Elimination of two frequency conversions (i.e., the modulator and demodulator), the chopper oscillator and the associated hardware reduces cost, size, weight and power of the system while improving reliability. Also, the detector DC offset compensator of the present invention eliminates the effect of spurious signals and local oscillator leakage. As an additional benefit, without a chopper circuit, the reference and error path time delays in the interference cancellation system may be matched more closely, thereby improving time delay tracking of the two paths over frequency and temperature. This matched delay is a necessary condition for achieving broad cancellation bandwidth.

Figure 2:
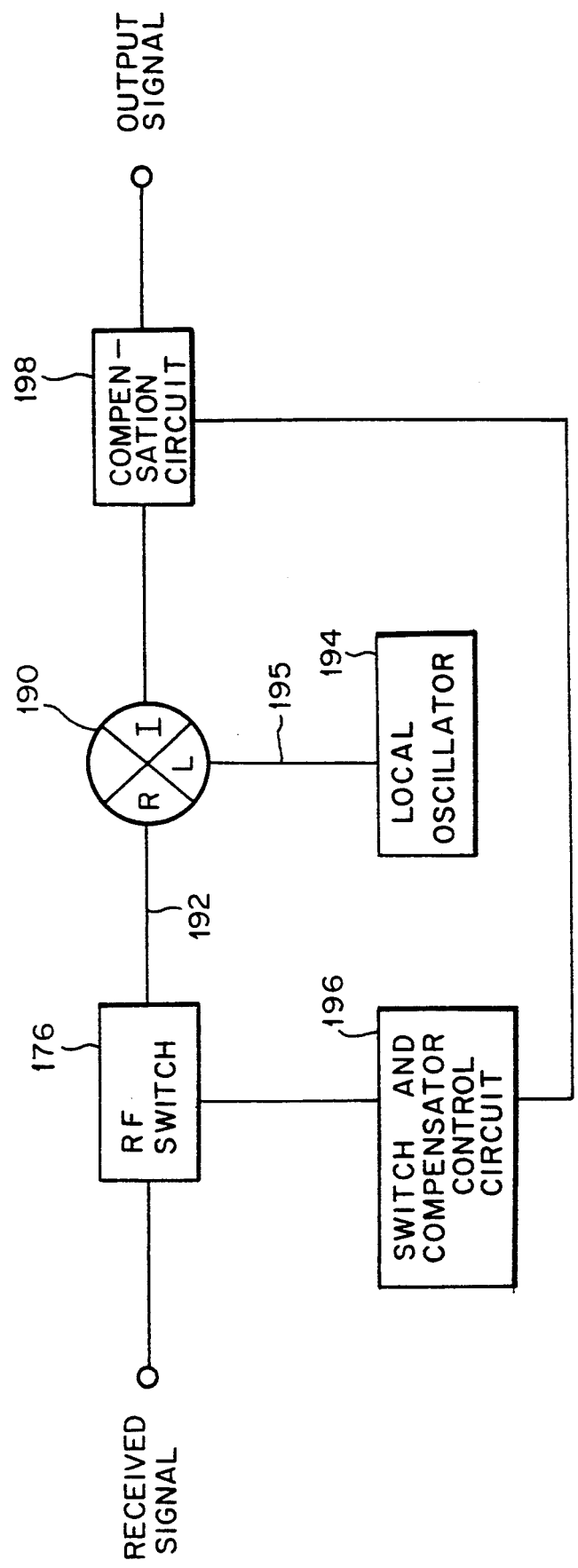
FIG. 2 is a functional block diagram of a system employing a mixer and incorporating the DC offset compensation circuit of the present invention.

As mentioned previously, the DC offset compensation circuit is applicable in many different types of sampled data or analog systems employing a synchronous (coherent) detector. More specifically, and as illustrated by FIG. 2 of the drawings, in many systems where a mixer 190 is employed to mix a signal back down to DC or baseband, the DC offset compensation circuit may be used in determining and removing the DC offset attributable to the mixer or other components of the system. In such a system employing a mixer 190, the RF switch 176 is placed in the received signal path 192 coupled to the RF input of the mixer 190, with the local oscillator 194 coupled via the local oscillator signal path 195 to the LO input of the mixer, as described previously. The switch 176 is actuated by a control circuit 196 to open and close, thereby selectively interrupting the received signal path 192 to the mixer 190. When the received signal path is interrupted by the switch, the DC offset on the IF output of the mixer is measured by a compensation circuit 198 coupled to be responsive to the IF output of the mixer and to the switch and compensator control circuit. The received signal path 192 is then reconnected to the mixer, and the measured DC offset is subtracted from the signal now present on the IF output of the mixer by the compensation circuit 198.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A DC offset compensation circuit for use with a detector of an interference cancellation system, the interference cancellation system having a detector, a reference signal path on which a reference signal representative of an interfering signal is provided to the detector, an error signal path on which an error signal, representative of a residual interfering signal of the radio receiver system to which the interference cancellation system is connected, is provided to the detector, and a signal controller which generates a cancellation signal for cancelling the residual interfering signal of the radio receiver system, the DC offset compensation circuit comprising:

an RF switch positioned in the error signal path of the interference cancellation system, the RF switch being switchable between at least an open position in which the detector is electrically disconnected from the error signal path, and a closed position in which the detector is electrically connected to the error signal path;

switch control means coupled to the RF switch for controlling the positioning of the RF switch in the open and closed positions, the detector providing a first DC signal when the RF switch is in the open position, and a second DC signal when the RF switch is in the closed position, the first DC signal corresponding to a DC offset voltage generated by the detector, the second DC signal corresponding to the sum of the DC offset voltage and a DC error signal voltage generated by the detector; and means responsive to the detector first and second DC signals for calculating the difference in magnitude between the first DC signal and the second DC signal, the calculating means being operatively coupled between the detector and the signal controller and generating a control signal provided to the signal controller, the control signal corresponding to the calculated difference in magnitude between the first DC signal and the second DC signal.

2. A method for compensating for DC offset voltages generated by a detector in an interference cancellation system, the interference cancellation system having a detector, a reference signal path on which a reference signal representative of an interfering signal is provided to the detector, an error signal path on which an error signal representative of a residual interfering signal of a radio receiver system to which the interference cancellation system is connected, is provided to the detector, and a signal controller which generates a cancellation signal for cancelling the residual interfering signal of the radio receiver system, the method comprising the steps of:

selectively disconnecting electrically the detector from the error signal path while providing the reference signal on the reference signal path to the detector, the detector providing a first DC signal representative of a DC offset voltage generated by the detector;

measuring the magnitude of the first DC signal;

selectively reconnecting electrically the detector to the error signal path so as to provide the error signal on the error signal path to the detector, the detector providing a second DC signal representative of a DC offset voltage and a DC error signal voltage corresponding to the error signal received by the detector;

measuring the magnitude of the second DC signal;

calculating the difference in magnitude between the first DC signal and the second Dc signal; and generating a control signal and providing the control signal to the signal controller, the control signal corresponding to the calculated difference in magnitude between the first DC signal and the second DC signal.

3. A DC offset compensation circuit for use with a system employing a detector, the detector including a mixer having a radio frequency (RF) signal input, a local oscillator (LO) signal input, and an intermediate frequency (IF) signal output, the system including a received signal path coupled to the RF input of the mixer for providing a received signal to the mixer, a local oscillator signal path coupled to the LO input of the mixer for providing a local oscillator signal to the mixer, and an output signal path coupled to the IF output of the mixer, the DC offset compensation circuit comprising:

an RF switch, the RF switch positioned in the received signal path of the system, the RF switch being switchable between at least an open position in which the mixer is electrically disconnected from the received signal path, and a closed position in which the mixer is electrically connected to the received signal path;

switch control means coupled to the RF switch for controlling the positioning of the RF switch in the open and closed positions, the mixer providing a first DC signal when the RF switch is in the open position and a second DC signal when the RF switch is in the closed position, the first DC signal corresponding to a DC offset voltage generated by the mixer; and means for subtracting the first DC signal from the second DC signal, the subtracting means being coupled to the output signal path of the system and providing an offset-corrected detector output signal, the offset-corrected detector output signal corresponding to the difference in magnitude between the first DC signal and the second DC signal.

4. A method for compensating for DC offset voltages generated by a detector used in a signal system, the system employing a detector, the detector including a mixer having a radio frequency (RF) signal input, a local oscillator (LO) signal input, and an intermediate frequency (IF) signal output, the system including a received signal path coupled to the RF input of the mixer for providing a received signal to the mixer, a local oscillator signal path coupled to the LO input of the mixer for providing a local oscillator signal to the mixer, and an output signal path coupled to the IF output of the mixer, the method comprising the steps of:

selectively disconnecting electrically the mixer from the received signal path while providing t he local oscillator signal on the local oscillator signal path to the mixer, the mixer providing a first DC signal on the output signal path, the first DC signal being representative of a DC offset voltage generated by the mixer;

measuring the magnitude of the first DC signal;

selectively reconnecting electrically the mixer to the received signal path so as to provide the received signal on the received signal path to the mixer, the mixer providing a second DC signal on the output signal path;

calculating the difference between the measured magnitude of the first DC signal and the second DC signal; and generating an offset-corrected detector output signal, the offset-corrected detector output signal corresponding to the calculated difference between the measured magnitude of the first DC signal and the second DC signal.

* * * * *